US011972502B2

(12) United States Patent
Block et al.

(10) Patent No.: US 11,972,502 B2
(45) **Date of Patent: *Apr. 30, 2024**

(54) TECHNIQUES FOR LOCATING AND OPERATING GASIFICATION PLANT HAVING PREDOMINATELY SCRAP TIRE RUBBER AS FEEDSTOCK

(71) Applicant: GREENTIRE ENERGY LLC, Pennington, NJ (US)

(72) Inventors: Jerome N. Block, East Brunswick, NJ (US); Ulf Hansson, Pennington, NJ (US); Nicholas Z. Hegedus, Pennington, NJ (US)

(73) Assignee: GREENTIRE ENERGY LLC, Pennington, NJ (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/241,701

(22) Filed: Jan. 7, 2019

(65) Prior Publication Data

US 2019/0378234 A1 Dec. 12, 2019

Related U.S. Application Data

(63) Continuation of application No. 12/511,302, filed on Jul. 29, 2009, now Pat. No. 10,332,226.

(60) Provisional application No. 61/088,384, filed on Aug. 13, 2008.

(51) Int. Cl.
*G06Q 90/00* (2006.01)
*G06Q 99/00* (2006.01)

(52) U.S. Cl.
CPC ............ *G06Q 90/00* (2013.01); *G06Q 99/00* (2013.01)

(58) Field of Classification Search
CPC ............................. G06Q 90/00; G06Q 99/00
USPC ........................................................ 705/500
See application file for complete search history.

(56) References Cited

U.S. PATENT DOCUMENTS

| | | | | |
|---|---|---|---|---|
| 5,364,996 | A | 11/1994 | Castagnoli et al. | |
| 5,380,352 | A * | 1/1995 | Greenwalt | C21B 13/0066 75/445 |
| 5,425,792 | A | 6/1995 | Bishop et al. | |
| 5,553,209 | A | 9/1996 | Johnson et al. | |

(Continued)

FOREIGN PATENT DOCUMENTS

| | | | | |
|---|---|---|---|---|
| CN | 101578234 | A * | 11/2009 | |
| GB | 842218 | A * | 7/1960 | B63J 2/06 |

(Continued)

OTHER PUBLICATIONS

Weil, Steffen, "Hydrogen energy from coupled waste gasification and cement production—a thermochemical concept study", International Journal of Hydrogen Energy 31 (2006), pp. 1674-1689. (Year: 2006).*

(Continued)

*Primary Examiner* — Tan D Nguyen
(74) *Attorney, Agent, or Firm* — Otterstedt & Kammer PLLC

(57) ABSTRACT

A parcel of land on which to site the plant is identified. The parcel of land is located such that about 3,500,000 to about 7,500,000 scrap tires per year are available for substantially regular and substantially continuous delivery to the plant, at a tipping fee of at least about $40.00 per ton. The plant is located on the parcel of land. One or more of synthesis gas, electricity, and steam produced by the plant are sold.

6 Claims, 7 Drawing Sheets

(56) References Cited

U.S. PATENT DOCUMENTS

| | | | | |
|---|---|---|---|---|
| 6,005,149 | A | 12/1999 | Bishop | |
| 6,024,226 | A | 2/2000 | Olivier | |
| 6,075,905 | A | 6/2000 | Herman et al. | |
| 6,237,208 | B1 | 5/2001 | Meeth | |
| 6,307,573 | B1 | 10/2001 | Barros | |
| 6,692,544 | B1 * | 2/2004 | Grillenzoni | C10L 5/361 44/589 |
| 7,028,478 | B2 | 4/2006 | Prentice, III | |
| 7,379,811 | B2 | 5/2008 | Rasmussen et al. | |
| 10,332,226 | B2 | 6/2019 | Block et al. | |
| 2003/0158668 | A1 | 8/2003 | Anderson | |
| 2004/0223628 | A1 * | 11/2004 | Call | G06K 9/3233 382/101 |
| 2005/0000162 | A1 | 1/2005 | Bishop et al. | |
| 2005/0031197 | A1 | 2/2005 | Knopp | |
| 2005/0080520 | A1 | 4/2005 | Kline et al. | |
| 2007/0256360 | A1 * | 11/2007 | Kindig | C10K 1/004 48/197 A |
| 2008/0278311 | A1 | 11/2008 | Grange et al. | |
| 2016/0326440 | A1 | 11/2016 | Spencer et al. | |

FOREIGN PATENT DOCUMENTS

| | | | | |
|---|---|---|---|---|
| JP | 11-125415 | A | 5/1999 | |
| JP | 2005265410 | A | 4/2005 | |
| WO | WO 99/34662 | | 7/1999 | |
| WO | WO-2005093222 | A2 * | 10/2005 | F23G 5/006 |
| WO | WO2007067898 | | 6/2007 | |
| WO | WO-2007106819 | A2 * | 9/2007 | C12C 11/02 |
| WO | WO-2017068188 | * | 4/2023 | |
| WO | WO-2014153570 | * | 9/2023 | |

OTHER PUBLICATIONS

Kalisz, Sylwester, "Co-firing of Biomass Waste-Derived Syngas in Coal Power Boiler", Dec. 2008, Energy, vol. 33, Issue 12, pp. 1770-1778. (Year: 2008).*

Conesa, Juan, "Complete Study of the Pyrolysis and Gasification of Scrap Tires in a Pilot Plant Reactor", 2004, Environment Science Technology, vol. 38, pp. 3189-3194. (Year: 2004).*

Umut Ozertem, "Learning to Suggest: a ML Framework for Ranking Query Suggestions", 2012, pp. 25-34 SIGIR'12. (Year: 2012).*

G.P.J. Dijkema, "A new Paradigm for Waste Management," 2000, Waste Management 20 (2000), pp. 633-638. (Year: 2000).*

UDig, User-Friendly Desktop Internet GIS, a GIS Framework for Eclipse, http://udig.refractions.net/, Jan. 4, 2010 1 Page.

Pitney Bowes, Business Insight, MapInfo Professional, The world's premier desktop mapping application, http://www.pbinsight.com/products/location-intelligence/applications/mapping-analytical/ Jan. 4, 2010 2 Pages.

Manifold System—The Ultimate GIS and Mapping Package, The World's Best GIS at an Unbeatable Price, http://www.manifold.net/index.shtml Jan. 4, 2010 6 Pages.

Doe—Fossil Energy: How Coal Gasification Power Plants Work, http://fossil.energy.gov/programs/powersystems/gasification/howgasificationworks.html Jan. 4, 2010 2 Pages.

Browse Bentley Products: software for the lifecycle of the world's infrastructure, Browse all Bentley Products Alphabetically, http://www.bentley.com/en-US/Products/ Jan. 4, 2010 3 Pages.

ESRI The GIS Software Leade GIS Software that Gives you the Geographic Advantage, http://www.esri.com/ Jan. 4, 2010 1 Page.

Leading GIS & Enterprise Engineering Software Integraph, http://www.intergraph.com/ Jan. 4, 2010 2 Pages.

GIS software—Wikipedia, http://en.wikipedia.org/wiki/GIS_software Jul. 28, 2009 2 Pages.

Google Earth—Wikipedia http://en.wikipedia.org/wiki/Google_earth Jul. 28, 2009 22 Pages.

Geographic information system, Wikipedia, http://en.wikipedia.org/wiki/Geographic_information_system Jul. 28, 2009 20 Pages.

Open Geospatial Consortium Inc. OpenGIS Web Map Server Implementation Specification, Mar. 15, 2006. 85 Pages.

Nexterra—Gasification Technology, http://www.nexterra.ca/technology/index.cfm Jul. 28, 2009 1 Page.

Biomass Gasification Technology, http://www.prmenergy.com/Contents/htm. Jul. 28, 2009 1 Page.

Primenergy http://www.primenergy.com/Aboutus.htm Aug. 21, 2008 2 Pages.

Meeting the World's Energy & Environmental Challenges, http://www.wowenergies.com/wowclean.html Jul. 28, 2009 2 Pages.

Shaw Environmental: Flooring Company Creating Innovative Flooring Solutions, http://www.shawfloors.com/ChangedBySwetha Jul. 28, 2009 1 Page.

CMS Energy—North America, http://www.cmsenergy.com/content.aspx?id=288%7CNorth%20America Jul. 28, 2009 1 Page.

CM Tire Recycling Solutions, http://www.cmshredders.com/default.aspx Jul. 28, 2009 1 Page.

Granutech—Saturn Systems—Granutech Crumb Rubber Systems, Saturn Shredders, http://www.granutech.com/shredders.html Jul. 28, 2009 2 Pages.

Contractor's Report to the Board. Technology Evaluation and Economic Analysis of Waste Tire Pyrolysis, Gasification, and Liquefaction, Mar. 2006. 52 Pages University of California Riverside.

Grass Gis—The World Leading Free Software GIS, http://grass.itc.it/ Jan. 4, 2010 2 Pages.

GE Energy—Geospatial Asset Management Smallworld, http://www.gepower.com/prod_serv/products/gis_software/en/index.htm Jan. 4, 2010 3 Pages.

Nexterra, Typical System Components, downloaded from http://www.nexterra.ca/files/thermal-system-components.php, Feb. 20, 2013 1 Page.

Nexterra, Nexterra's Gasification Technology, downloaded from http://www.nexterra.ca/files/gasification-technology.php, Feb. 20, 2013 2 Pages.

Mullen, J. F. Steam Generation from Solid Wastes: the Connecticut Rationale Related to the St. Louis Experience. Combustion Engineering, 1974. STIC abstract, 3 pages.

Toet, A. "Image fusion by a ratio of low pass pyramid", Elsevier Science Publishers B.V., 1989, p. 245-253.

Comer, K. "Feasibility Study for a Small-Scale Biomass Project for the Warranton, VA area", Nov. 2, 2007, Final Report (Draft), Antares Group Incorporated, pp. 1-76.

Uffelman, J. "A Practitioner's Guide to Section 101 Invalidity: Analyzing Abstract Concepts in the Wake of Alice v. CLS Bank", BNA's Patent, Trademark, Copyright Journal, 90 PTCJ 2215, May 29, 2015, pp. 1-12.

Google Search "gasifier generator shredded tires", pp. 1-2. (Year: 2019) Jan. 31, 2019.

Technology Evaluation and Economic Analysis of Waste Tire Pyrolysis, Gasification, and Liquefaction, Mar. 2006, by University of California Riverside, pp. 1-9. (Year: 2006).

* cited by examiner

SYNGAS FOR SALE
126
TO FIG. 2 & FIG. 3
A
CLEAN-UP
124
ASH FOR SALE
190
SYNGAS
AIR
GASIFIER
118
120
122
TDF STORAGE
116
SHREDDER
112
SCRAP METAL
114
UNLOADING AREA
110
WEIGH STATION
102
WEIGH STATION
102
WASTEWATER DISPOSAL
130
OFFICES, STORAGE, INSTRUMENTATION AND CONTROL
128
104
106
108

TECHNIQUES FOR LOCATING AND OPERATING GASIFICATION PLANT HAVING PREDOMINATELY SCRAP TIRE RUBBER AS FEEDSTOCK

CROSS-REFERENCE TO RELATED APPLICATIONS

This patent application is a continuation of U.S. patent application Ser. No. 12/511,302 filed Jul. 29, 2009, which in turn claims the benefit of U.S. Provisional Patent Application Ser. No. 61/088,384 filed on Aug. 13, 2008, and entitled "Techniques for Locating and Operating Gasification Plant Having Predominately Scrap Tire Rubber as Feedstock." The complete disclosures of the aforementioned U.S. patent application Ser. No. 12/511,302 and Provisional Patent Application Ser. No. 61/088,384 are expressly incorporated herein by reference in their entireties for all purposes.

FIELD OF THE INVENTION

The present invention generally relates to the location and operation of industrial plants and, more particularly, to location and operation of gasification plants.

BACKGROUND OF THE INVENTION

As energy prices have increased, interest has arisen in alternative sources of energy. Furthermore, concern about the environment has prompted concern about the disposal of waste materials.

SUMMARY OF THE INVENTION

Principles of the present invention provide techniques for locating and operating a gasification plant having predominately scrap tire rubber as feedstock. In one aspect, an exemplary method (which can be at least partially computer-implemented) for locating and operating a gasification plant employing predominately tire-derived fuel as a feedstock includes the steps of identifying a parcel of land on which to site the plant, the parcel of land being located such that at least about 3,500,000 scrap tires per year are available for substantially regular and substantially continuous delivery to the plant, at a predetermined adequate tipping fee; locating the plant on the parcel of land; and selling at least one of synthesis gas, electricity, and steam produced by the plant.

In another aspect, an exemplary method (which can be at least partially computer-implemented) for locating a gasification plant employing predominately tire-derived fuel as a feedstock includes the steps of identifying a parcel of land on which to site the plant, the parcel of land being located such that at least about 3,500,000 scrap tires per year are available for substantially regular and substantially continuous delivery to the plant, at a predetermined adequate tipping fee; and advising a party of the parcel, the party being an operator who wishes to operate the plant on the parcel and sell at least one of synthesis gas, electricity, and steam produced by the plant.

In a more general approach, a method can include determining the approximate number of scrap tires available per year in a certain area, the tipping fee at which they are available, and so on, and checking whether criteria, disclosed herein, for economic location and/or economic operation are met.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media) and are implemented on one or more hardware processors.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
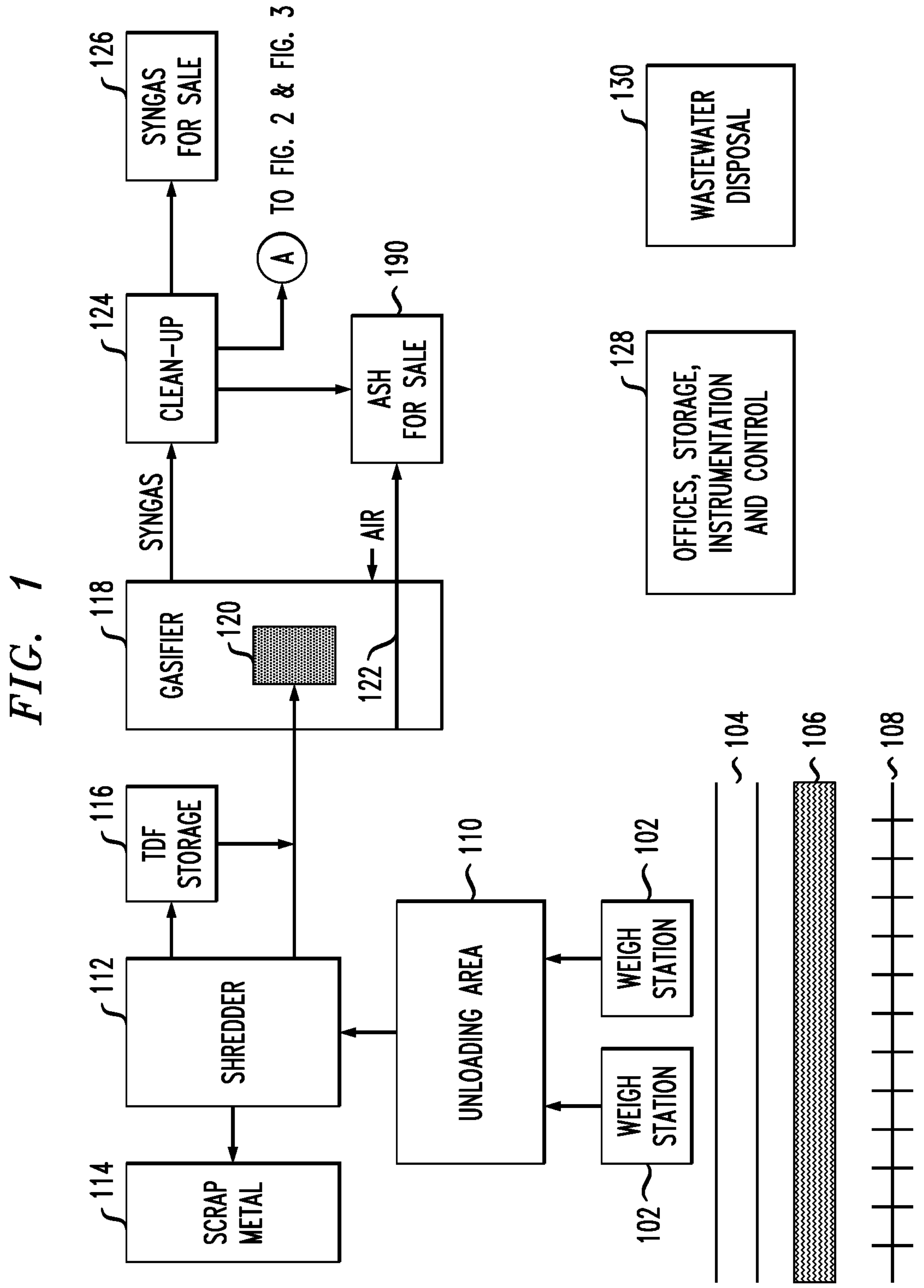
FIG. 1 is a schematic view of a first portion of an exemplary embodiment of a tire gasification plant, according to an aspect of the invention.

Aspects of the invention address thermo-chemical conversion, by gasification, of carbonaceous material in a feedstock comprising predominately scrap tires into Syngas (synthesis gas), which can be used, for example, to produce steam and/or electricity.

Liquefaction, pyrolysis and gasification are three somewhat similar thermo-chemical processes designed to convert carbonaceous feedstock at elevated temperatures into usable products. Of the three processes, liquefaction uses the lowest temperatures to alter a substance from a solid into a liquid state; pyrolysis is the thermal degradation or volatilization of a substance without the addition of air or oxygen, at temperatures usually between 400° to 800° Centigrade, to generate a combination of liquid and gaseous products; and gasification is a more reactive thermal process with controlled introduction of limited quantities of air, oxygen, or steam at temperatures usually between 700° to more than 800° Centigrade to generate primarily gaseous products and a relatively small quantity of solids.

Gasification is typically a multi-step process including, for example: (1) feedstock preparation; (2) introduction of the feedstock into the reactor; (3) decomposition of the feedstock by the gasification reaction; and (4) separation and post-processing of the gases and solids.

The pyrolysis and gasification processes per se were originally developed in the 1800s to produce "town gas" for lighting and cooking. Natural gas and electricity soon replaced town gas for these applications, but these processes have been utilized since the 1920s for the production of synthetic chemicals and fuels.

Gasification and pyrolysis technologies lost favor after the Second World War, when clean and renewable energy was not a priority and affordable liquid fuel became readily available. In the last few decades, however, several gasification and pyrolysis plants have come on-line, principally in Japan and Europe, where the use of landfills has been prohibited or is far more limited than in the United States. Of necessity, these regions have taken the lead in developing alternative ways to dispose of waste.

Europe and Japan focused primarily on disposing of municipal solid waste ("MSW") in an environmentally sound way, rather than on energy recovery or profit. MSW generally includes principally a blend of traditional household waste (e.g., food, paper products, plastics) and light commercial waste (paper, plastics), relatively small quantities of construction debris (e.g., waste lumber), and even smaller quantities of metals and scrap tires (believed to be 1-2 percent at most). Given the predominance of food, paper and wood, the usual MSW blend generally has relatively high moisture content and a relatively low BTU-value. Consequently, gasification and/or pyrolysis of MSW generates a relatively low energy yield per ton, and the return on investment in MSW gasification and/or pyrolysis plants is correspondingly low (except in those European countries where there is a relatively high MSW tipping fee and correspondingly high energy price). In certain locations in Western Europe, fairly substantial tipping fees can be obtained for MSW, and the governments effectively subsidize the high capital costs of the MSW gasification plants by setting relatively high prices for the electricity generated therefrom; however, this is not the situation in the US.

By way of clarification and provision of additional detail, one or more embodiments of the invention involve location and operation of a plant using predominately (that is, more than 50%) tire rubber as feedstock, preferably at least 90% tire rubber as feedstock, more preferably 95-100% tire rubber as feedstock, and most preferably only tire rubber (together with those trace impurities commonly found in pelletized tires). All percentages are weight percentages. It is believed that a fairly high percentage of tire rubber (95-100%) is preferred for profitability, since two substantial income streams can be obtained, namely, the tipping fee on the incoming side, as well as the energy from the high BTU value of the rubber on the outgoing side. Furthermore, it is presently believed that a consistent feedstock is preferable for successful operation of the tire gasification plant, in terms of consistent BTU values and consistent (and preferably low) water content; such consistency helps attain, for example, a consistent and desirable temperature range in the gasifier and consistent energy production.

Because of the historical focus on disposing of MSW and because of its relatively low-BTU-value, gasification and/or pyrolysis reactors are typically designed to handle only low-BTU-value feedstock. Consequently, traditional gasification and pyrolysis systems were not designed to handle the high temperatures generated by gasification of exclusively high-BTU-value feedstock such as tires or plastics. Note that because of its limited temperature range, pyrolysis is less suitable than gasification for handling feedstock including almost entirely high-BTU-value plastics or rubber. Similarly, because of the historical focus on disposing of MSW and because of its relatively low-BTU-value, harnessing the correspondingly low energy output generated from MSW gasification and/or pyrolysis plants was never a primary focus.

Because of rapidly increasing fuel prices and growing environmental concerns, there is renewed interest in gasification and/or pyrolysis of carbon-based feedstocks as a source of much cleaner alternative energy.

As shown in FIG. 1, and as will be discussed further below, usually, a gasifier 118 includes a cylindrical container with space within for a quantity of feedstock 120, an air inlet, a gas exit, and a grate 122. The gasifier's design depends upon the type of feedstock to be used. A gasification system typically includes the gasifier 118, purification or "scrubbing" units, designated generally as "clean up" 124, the energy converter (a gas burner such as Syngas fired boiler 132 in FIG. 2 or internal combustion engine such as gas turbine 302 in FIG. 3), a stack 136 to vent emissions, and a wastewater disposal system designated generally as 130. The newer systems, geared to energy recovery, combine the gasifier 118 with a boiler or turbine to produce steam and/or electricity. In some cases, as shown in FIG. 3, the gas and steam turbines operate together as a combined cycle. Biomass gasifiers have the potential to be up to twice as efficient as conventional boilers at generating electricity. For even greater efficiency, heat from the gas turbine exhaust can be used to generate additional electricity with a steam cycle. These improvements in efficiency, combined with the higher cost of oil and natural gas, make environmentally clean biomass energy through gasification increasingly more competitive. Because the modern technology uses a decentralized energy conversion system, the process now can be made to operate economically even on a relatively small scale.

Air emissions from a gasification plant generally satisfy applicable U.S. regulatory limits. This is because state-of-the-art gasification processes now are nearly closed-loop systems, routinely use very little air or oxygen, and achieve sulfur removal efficiencies of up to 95% while generating from one-sixth to less than one-eighth the amount of solid waste generated by alternative processes. Gasification also generates far fewer emissions of $SO_2$, $NO_x$, CO and particulates than those achieved by the commonly-used alternative processes. With the addition of a state-of-the-art emissions scrubbing or reduction system, the emissions can be reduced below all applicable U.S. regulatory limits (including the stringent limits in California, and even below the more stringent German emissions limits). The end product of the gasification process is the aforementioned Syngas, with properties akin to, and burning as cleanly as, natural gas.

The Syngas generated from gasification can be sold as fuel. Alternatively, it may be burned to fuel (i) a boiler to produce steam for sale, (ii) a boiler to generate steam for operating a steam turbine for electricity production, or (iii) a gas turbine for electricity production.

Gasification and pyrolysis plants exist throughout the world using a variety of low-BTU-value, carbonaceous feedstocks, such as MSW, solid residue from wastewater treatment (i.e., sludge), poultry litter, wood chips, olive byproducts, rice byproducts, corn byproducts, or combinations of the foregoing. Given the capital costs of these gasification plants, because the "tipping fees" payable to the facility owners to accept the feedstock are either non-existent or relatively low for these feedstocks, and because the energy output from gasification of these feedstocks is relatively low, these facilities likely are neither economical nor commercially profitable. They exist principally to dispose of waste relatively cleanly. As used herein, a "tipping fee" is a fee payable to the operator of a plant in order to accept the feedstock.

Some gasification plants use medium-BTU-value feedstocks. For example, Shaw Industries' Plant 81 in Dalton, Georgia, gasifies carpet remnants and wood waste to generate steam energy piped to its adjacent carpet manufacturing plant. Coal has a relatively high BTU-value, but not as high as tire rubber or plastic. There is no "tipping fee" payable for coal as it is a commodity in high demand, and coal gasification facilities must pay for their feedstock. Coal gasification facilities, therefore derive income only from the energy they produce, and tend to be profitable only when large quantities of coal are gasified to produce large quantities of electricity (e.g., more than 250 Megawatts).

Worldwide, it is believed that only one facility uses exclusively high-BTU-value plastic as its gasifier feedstock, namely, the Poligás plant in Ribesalbes, Spain, which exclusively uses discarded plastic wrappings from the ceramics industry as its feedstock. It is believed that the Poligás plant, however, lacks sufficient feedstock to operate even close to full-time, operates far below capacity, and therefore is believed to be unprofitable.

The primary technical obstacles to gasifying a feedstock including predominately tire rubber have been: (i) generation of higher temperatures in the gasification chamber than most existing gasification systems are designed to withstand; and (ii) generation of zinc oxide in quantities that tend to corrode the metal components of most existing systems. These issues can be overcome, as described hereinafter, by using refractory-lined equipment (in an alternative but less economically preferable approach, special metal alloys can be employed in exposed equipment). Aspects of the invention provide an economically viable and profitable business model for locating and operating a gasification plant using predominately tire rubber as its feedstock.

According to the Rubber Manufacturers Association, a trade association representing the tire manufacturing industry's United States interests, 299 million scrap tires were generated in the United States in 2005, a nearly eight-fold increase annually in the number of scrap tires since 1990. The number of scrap tires generated annually has risen as a function of the number of new tires sold in and imported into the United States. The accepted rule of thumb is that the United States generates one scrap tire per year per person. Therefore, as the population grows, the number of scrap tires generated annually grows correspondingly.

Of the 299 million scrap tires generated in the United States in 2005, 155 million were consumed as tire derived fuel ("TDF") in various industrial facilities, 49 million were used in the civil engineering market, 38 million were used in ground rubber applications, 7 million were exported, 6 million were cut, punched or stamped, 3 million were used for agriculture and other miscellaneous uses, 1 million were used in electric arc furnaces, and the remaining 40 million presumably were added to the existing stockpiles that totaled 188 million scrap tires at the end of 2005.

Tires have very high carbon content, and a correspondingly very high BTU-value. Consequently, scrap tires represent a tremendous source of untapped energy. Aspects of the invention provide techniques by which to dispose of scrap tires in an environmentally "clean" and sound manner while recovering the tires' untapped energy.

At present, there are four noteworthy markets for scrap tires—TDF, ground rubber applications, civil engineering applications, and the export market. TDF applications consumed almost 52% of the total scrap tires generated in the United States in 2005. Presently, TDF applications are utilized in industrial settings where the tires are incinerated (burned in an oxygenated environment) to generate steam or electricity. This simple but environmentally catastrophic process occurs most often in what euphemistically is known as a "cement kiln" (in the cement industry) or a "lime kiln" (in the lime production industry), or in a "tire-to-energy" facility (such as the Exeter Energy facility in Sterling, Connecticut). This antiquated process emits far, far greater quantities of carbon and other pollutants into the atmosphere than gasification, and it is less efficient than gasification at recovering the scrap tires' untapped BTU value and converting it into energy.

Approximately 16% of the scrap tires generated annually in the United States are reprocessed for use in civil engineering applications, for example as a component in roadway resurfacing materials. This re-use of the tire rubber does not eliminate the rubber from the environment; it merely spreads the non-biodegradable rubber across a wider surface area of the Earth. Also, it wastes the rubber's substantial, untapped energy value.

Approximately 13% of the scrap tires generated annually in the United States are shredded or ground into pellets sold for use as playground surfacing material, artificial mulch used in landscaping, and as surfacing for horse rings. Again, this re-use of tire rubber does not eliminate the rubber from the environment; it merely spreads the non-biodegradable rubber across a wider surface area of the Earth. Again, the rubber's substantial, untapped energy value is wasted.

Approximately 2% of the scrap tires generated annually in the United States are exported for use outside of the United States where the regulatory environment permits the use of tires too worn for use in the United States. This merely shifts the disposal problem to third world countries lacking the resources to dispose of the tires efficiently or in an environmentally "clean" or sound manner.

Although the market for TDF products has grown significantly since 1990, it is clear from the published statistics that scrap tires still are not being recycled in large enough quantities to eliminate scrap tire piles in the United States. For example, in New Jersey alone there are 29 major scrap tire dumps containing from 9 million to 12 million scrap tires. It is estimated that New Jersey generates approximately 8.4 million additional scrap tires annually. In addition to their existing, large scrap tire stockpiles, New Jersey's regional neighbors (New York, Connecticut, Pennsylvania, Delaware and Maryland) together generate approximately 41.75 million additional scrap tires annually.

In sum, the United States generates far more scrap tires than it can dispose of, and this trend shows no signs of abating. To the extent scrap tires generated in the United States are disposed of at all, the disposal techniques used are not environmentally sound (e.g., incineration, spreading the rubber across a wider surface area of the Earth, selling scrap tires for use and/or disposal in Third World countries), and none of these techniques (apart from incineration) takes advantage of the tire rubber's substantial, untapped BTU value.

Aspects of the invention provide techniques for locating and operating a plant for disposal of scrap tires in an environmentally "clean" and sound manner while recovering the tires' untapped energy, via a gasification plant using predominantly tire rubber as its feedstock. One or more embodiments of the invention provide a method for locating and operating a plant which carries out the thermo-chemical conversion, by gasification, of tire rubber feedstock into Syngas. The Syngas itself can, for example, be sold, burned to fire a boiler to make steam for sale, burned in a gas turbine to make electricity for sale, and/or burned to fire a boiler to make steam for a steam turbine to generate electricity for sale, and to generate associated, saleable renewable energy credits. As noted elsewhere herein, in one or more embodiments, predominately (that is, more than 50%) tire rubber is used as feedstock, preferably at least 90% tire rubber as feedstock, more preferably 95-100% tire rubber as feedstock, and most preferably only tire rubber (together with those trace impurities commonly found in pelletized tires).

Figure 4:
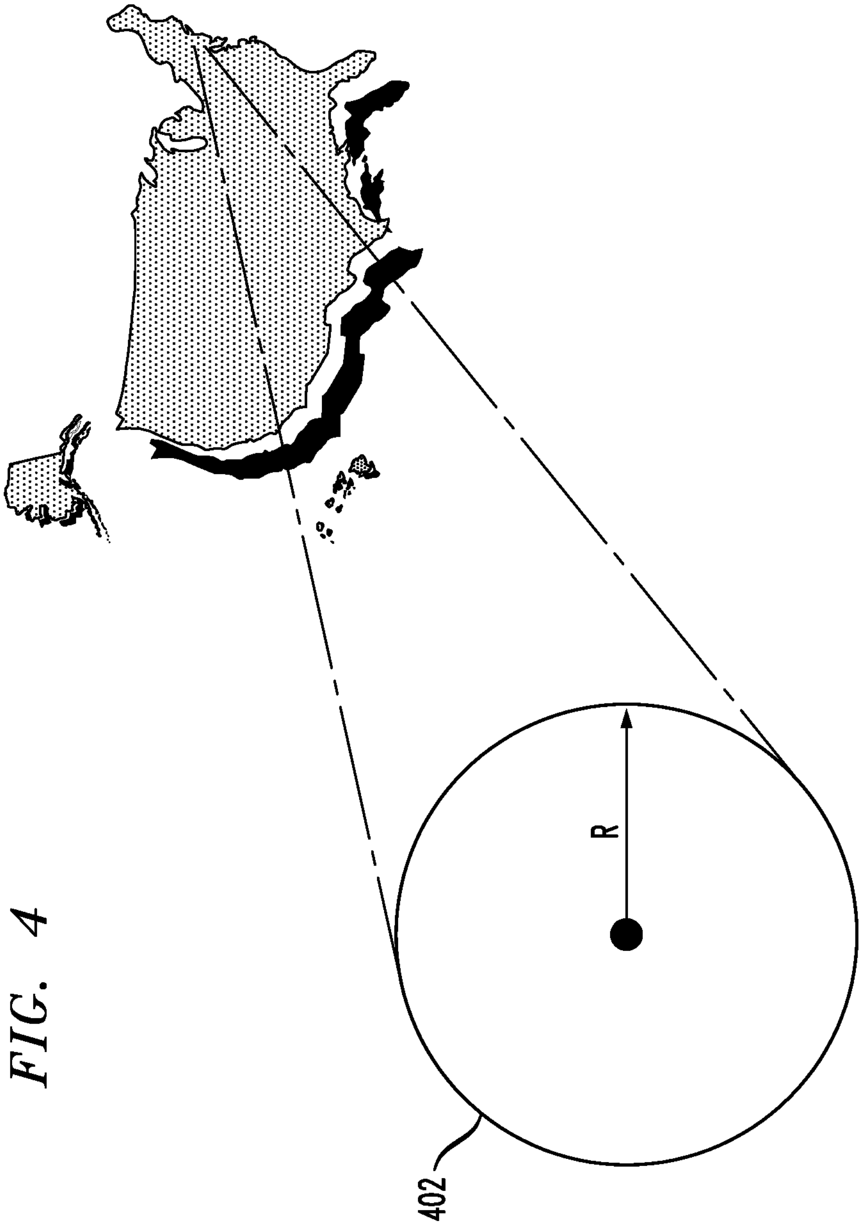
FIG. 4 depicts exemplary techniques for locating a tire gasification plant, according to another aspect of the invention.

An exemplary method, according to an aspect of the invention, includes locating a parcel of land on which to site the building(s) and equipment of the plant. The assistance of commercial real estate agents, local environmental regulatory authorities, and/or local zoning officials is appropriate, in one or more embodiments, as well as computer graphics and overlay techniques and/or Internet search techniques discussed below. Other customary techniques used to locate suitable real estate parcels can be employed, such as, for example, newspaper real estate sections. Any suitably sized parcel with room for the required buildings and equipment, which meets the other requirements set forth herein, can be employed; at present, it is believed that the parcel should be from about two acres to about six acres, and preferably about four acres. The plant should preferably be located within North America (comprising the United States, Canada, and Mexico). The plant should preferably be located in a suitable supply area. As shown in FIG. 4, the supply area is a theoretical geographic circle 402 with the plant at its center, having a predetermined radius R. The radius is preferably no more than about 150 miles, and most preferably no more than about 80 miles. Additional preferred characteristics of the supply area will be discussed below.

It is preferred that there be access to the plant via a suitable and conveniently accessible roadway, and most preferable that there also be additional access via a suitable and conveniently accessible railway and/or waterway. Such access preferably enables tire suppliers (discussed further below) to deliver tires to the plant. The plant should be located within a geographical region in which it is permissible for the plant to operate according to applicable zoning, environmental, and all other laws, rules and regulations. There should be convenient access to a sewer system capable of handling the plant's waste water, and there should also be convenient access to the electrical power grid.

Further details will now be provided about the aforementioned supply area 402. For the plant to operate profitably, the supply area should be such that it is possible for the plant to receive substantially regular and substantially continuous supplies of sufficient quantities of scrap tires. As used herein, "substantially," in this context, means that the supplies are sufficiently regular and continuous such that any occasional delays or gaps in delivery do not prevent economic operation of the plant. At present, it is believed that sufficient quantities include at least about 3,500,000, and preferably at least about 5,000,000, scrap tires each year. Suitable sources of scrap tires include scrap tire piles, scrap tire suppliers and/or scrap tire haulers or dealers. The sources are referred to herein collectively as "tire suppliers." It is preferable that the tire suppliers pay the owners of the plant a "tipping fee" sufficient to enable economic operation of the plant; for example, at least about $40.00 per ton of scrap tires supplied. Note that there is no upper limit on the number of scrap tires that should be available in the region each year. However, it is presently believed that for economic reasons (start-up capital costs), the plant should be sized to gasify about 3,500,000 to about 7,500,000 scrap tires per year, and preferably about 5,000,000 scrap tires per year. The tipping fee value of at least about $40.00 per ton of scrap tires is based upon gasifying about 5,000,000 scrap tires per year, in 2008 US dollars, and may be suitably adjusted for inflation using the US consumer price index, producer price index, or the like. In general terms, the tipping fee per ton should be adequate to result in profitable operation, given the other variables such as the size of the plant, price available for steam, Syngas, and/or electricity, and so on. Areas with large tracts of vacant land available for dumping may not provide adequate tipping fees.

With reference to FIG. 1, the aforementioned plant includes one or more weigh stations 102 (preferably two such stations), at which to weigh the incoming scrap tires, preferably while such tires are still loaded on the transportation vehicle. As noted, proximity to one or more of a road 104, waterway 106, and railway 108 is desirable. A suitable unloading area 110 can be provided proximate to the weigh stations 102, wherein the scrap tires can be unloaded for transfer to shredder 112. In shredder 112 the scrap tires are removed from any metal rims, the tire rubber is shredded into pellets suitably sized for gasification (preferably approximately ¼" in diameter, although this dimension is meant to be exemplary and non-limiting), and in which the scrap tires' remaining metal components (i.e., belting, mesh and/or wires) is removed and aggregated with the metal rims for further processing (preferably baling) for sale as scrap metal, as indicated at location 114. The pelletized tire rubber is referred to herein as tire-derived fuel ("TDF"). The shredding process just described can be implemented, for example, using commercially available technology sold, for example, by CM Tire Shredding Systems, 1920 Whitfield Avenue, Sarasota, FL 34243, USA; or Granutech-Saturn Systems, 201 East Shady Grove Road, Grand Prairie, TX USA 75050.

A storage area 116 for storage of TDF is preferably outfitted with fire prevention, suppression and control systems in which the TDF (preferably in a quantity sufficient to sustain about two weeks of plant operations) may be stored pending transfer into the gasifier 118. Suitable solid handling equipment, such as augers and/or conveyer belts (omitted from the figures for brevity), may be provided by which the TDF may be transferred either from the shredder 112 directly into the gasifier 118, from the shredder 112 directly into the storage area 116, and/or or from the storage area 116 directly into the gasifier 118. The TDF is gasified in gasifier 118 to produce Syngas, which can be cleaned up to capture and remove ash and fly ash, and remove the remaining particulate to reduce the particulate level to legally permitted levels, as well as removing any other undesirable elements, compounds, or materials. In one or more embodiments, a cyclone is employed to remove particulates before the Syngas is burned, as at location 124, and further pollution control is employed after combustion, as at block 134, to remove $NO_x$, $SO_x$, heavy metals, and so on, prior to stack 136. In some embodiments, the cleaned Syngas may be offered for sale, as depicted at location 126.

Figure 2:
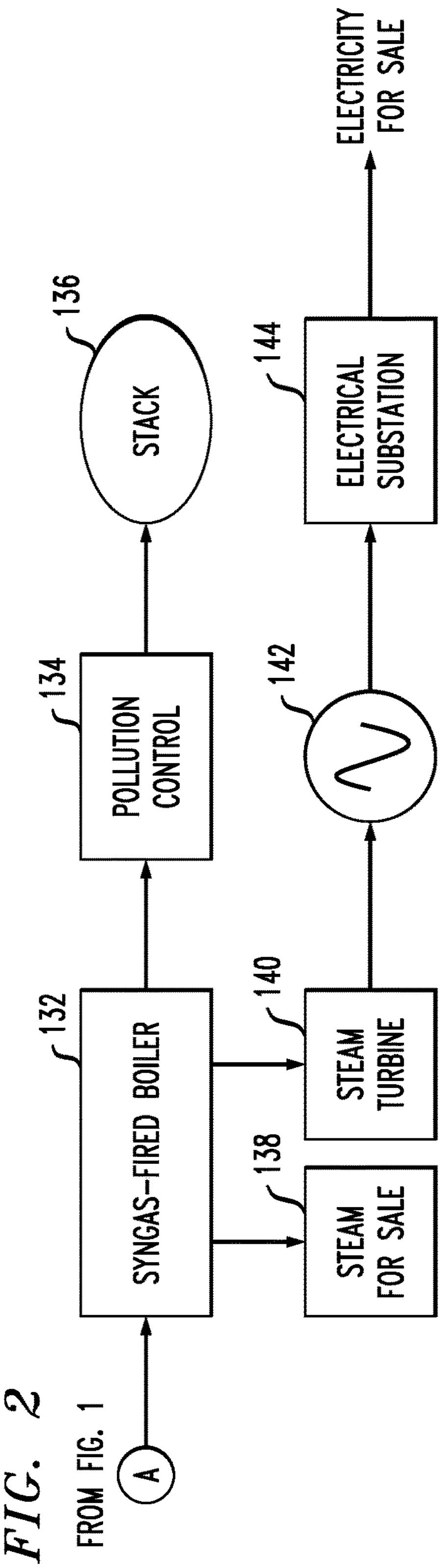
FIG. 2 is a schematic view of a second portion of the exemplary embodiment of FIG. 1.
Figure 3:
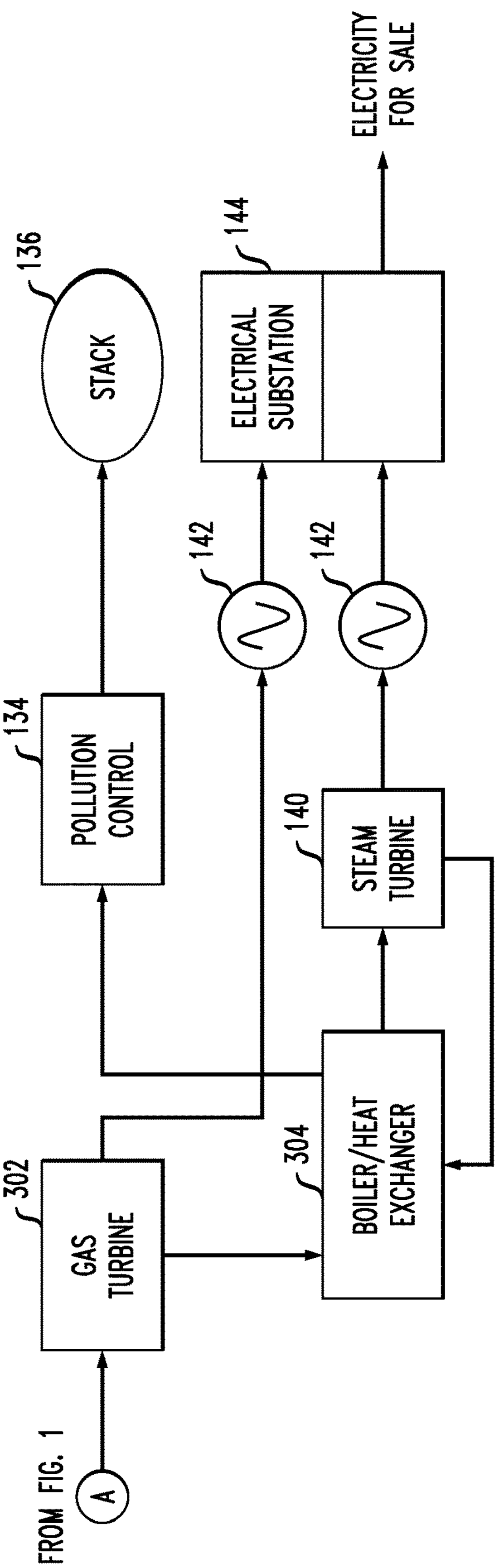
FIG. 3 is a schematic view of an alternative form of second portion of the exemplary embodiment of FIG. 1.

As shown in FIG. 2, in a first exemplary and non-limiting embodiment, Syngas is combusted in a Syngas-fired boiler 132 and heat is transferred from the flue gas to feedwater (not shown) to generate steam. As shown at location 138, the steam could be sold. The flue gas is passed through suitable pollution control equipment 134 to stack 136. In addition to, or instead of, selling the steam, a “power island” area can be provided for a steam turbine 140 and generator 142 by which to generate electricity from the steam. Suitable condensers, feedwater pumps, make up water supply, and the like can be included and are omitted for clarity. Pollution control equipment 134 preferably cools the combustion products and reduces the level of emissions (particularly nitrogen oxides ($NO_x$) and sulphur oxides ($SO_x$)) to legally permitted levels, and may be implemented, for example, by (i) using an intermediate Syngas combustion system using refractory lined equipment, followed by chemical processing known as selective non-catalytic reduction (“SNCR”), (ii) a selective catalytic reduction system (know as “SCR”), or (iii) using the WOWClean technology and system sold by WOW Energies, Inc., Texas Energy Center, 1650 Hwy. 6, Suite 300, Sugar Land, Texas 77478 USA. Approach (iii) is currently believed to be preferable.

As indicated at location 130 in FIG. 1, a connection by which waste water, if any, may be flushed into a sewer system is preferably available (as is adequate water supply). If electricity is being generated, then a connection to the electrical power grid via an electrical substation 144 can be provided, as shown in FIGS. 2 and 3. As shown at location 128 in FIG. 1, a single area, or two or more separate areas, can be provided for the plant’s computerized and electrical instrumentation, controls and systems; for storage of spare parts, chemicals and supplies; and for administrative offices and associated facilities.

Any number of gasifiers 118 can be employed; it is presently believed that approximately one to three gasifiers 118 are appropriate. In one or more embodiments, the one or more gasifiers are sized to convert, in aggregate, from about 7,990 lbs/hour to about 17,123 lbs/hour (but preferably about 11,415 lbs/hour) of TDF into Syngas sufficient to generate from about 5 MW to about 15 MW (but preferably about 10 MW) of electricity, and are preferably designed to operate 24 hours each day, seven days each week, while requiring no more than about four weeks’ down time for maintenance annually (the preferred Gasification Equipment is the technologies owned and/or sold by Primenergy, LLC (in Tulsa, Oklahoma, USA), PRM Energy Systems, Inc. (in Hot Spring, Arkansas, USA), or Nexterra Energy Corp. (in Vancouver, British Columbia, Canada), a non-limiting example of which is the refractory-lined, R-24 gasifier, available from Primenergy, LLC, P. O. Box 581742, Tulsa, Oklahoma 74158 USA, with thermal train, utilizing Primenergy LLC’s air blown, updraft, fixed bed gasification technology and equipment designed to operate at sub-atmospheric and sub-stoichiometric conditions).

It should be noted that an advantage of one or more embodiments of the invention is that, unlike incineration, gasification techniques do not generate Dioxins or Furans.

As shown in FIG. 3, in a second exemplary and non-limiting embodiment, Syngas is combusted in a gas turbine 302 and heat is transferred from the combustion products in the turbine exhaust to a boiler and/or other heat exchanger arrangement 304 (such as a turbine exhaust steam generator) to generate steam to power turbine 140. After passing through boiler 304, the combustion gases are passed to the pollution control equipment 134. The gas turbine can power a generator 142, and steam turbine 140 also powers a generator 142. Generators 142 generate electricity which may be supplied to the grid by substation 144. Note that elements in the figures that are similar have the same reference characters and are not necessarily described again for each figure. Note also that not every gas turbine installation will have elements 304 and 140, and that the gas and steam turbines can power the same or different generators. Condensate return is indicated by the arrows from steam turbine 140 to boiler 304 (pumps, condenser, and so on omitted for clarity).

Preferably, when operating the plant, there is a regular and continuous sale of the Plant’s tangible products, which may include scrap steel, ash, Syngas, steam, and/or electricity. In a preferred approach, the electricity preferably is sold at a price of at least $50.00 per megawatt-hour. Furthermore, it is also preferable that there be the sale, from time to time, of renewable energy certificates (“RECs”), also known as Green Tags or Tradeable Renewable Certificates (“TRCs”), if any are generated by virtue of the Plant’s electricity production. As known to the skilled artisan, Renewable Energy Certificates (RECs), also known as Green Tags, Renewable Energy Credits, or Tradable Renewable Certificates (TRCs), are tradable environmental commodities in the United States which represent proof that 1 megawatt-hour (MWh) of electricity was generated from an eligible renewable energy resource. Sale of ash (for example, from the grate 122 of the gasifier 118 and/or from the clean-up process 124) is depicted at location 190 in FIG. 1. Sale of electricity to the utility from substation 144 is depicted in FIGS. 2 and 3.

Embodiments of the invention thus provide a commercially profitable method by which to dispose of whole scrap tires and/or tire rubber in an environmentally “clean” and sound manner while recovering the tires’ component steel for resale, and the tires’ untapped energy for sale as Syngas, and/or steam and/or electricity generated therefrom.

Figure 5:
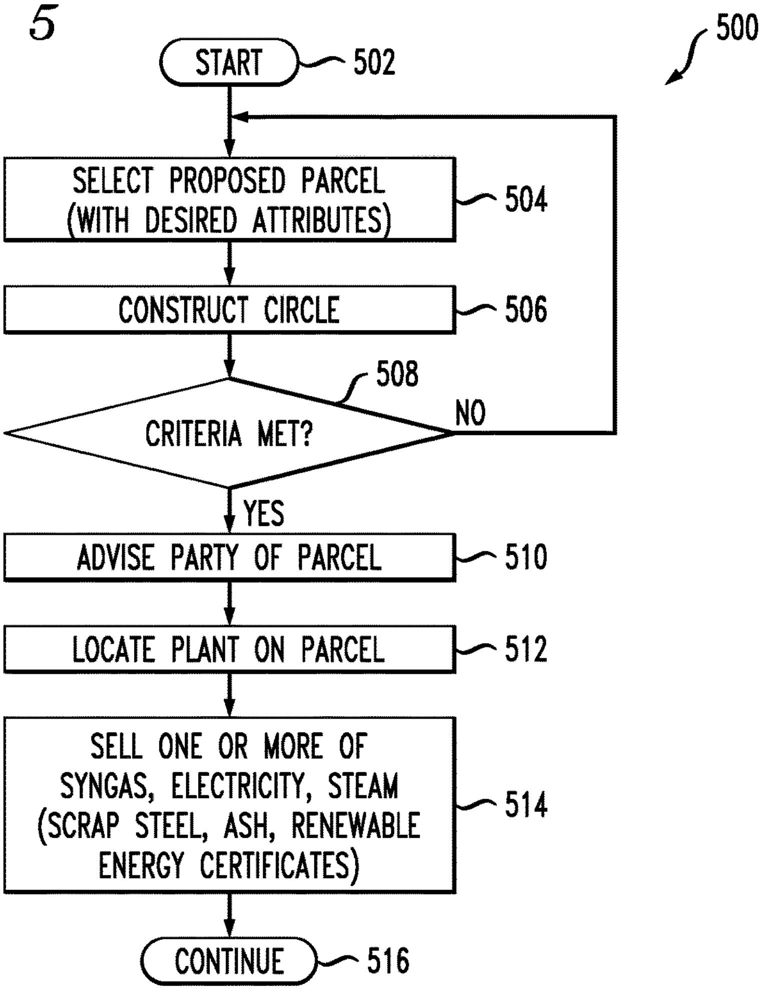
FIG. 5 is a flow chart of exemplary method steps, according to a further aspect of the invention.

FIG. 5 presents a flow chart 500 which depicts exemplary method steps. The method begins at block 502. In one aspect, an exemplary embodiment of a method for locating and operating a gasification plant employing predominately tire-derived fuel as a feedstock is presented. The method includes the step of identifying a parcel of land on which to site the plant, the parcel of land being located such that at least about 3,500,000 scrap tires per year are available for substantially regular and substantially continuous delivery to the plant, at a predetermined adequate tipping fee (for example, at least about $40.00 per ton in 2008 dollars, as discussed herein). One exemplary and non-limiting way to identify such a parcel will be discussed shortly with regard to steps 504-508. Also included are steps 512, locating the plant on the parcel of land; and step 514, selling at least one of synthesis gas, electricity, and steam produced by the plant. The method continues at block 516.

As noted, one non-limiting way to carry out the identifying step will now be discussed. In this non-limiting example, the identifying step includes the sub-step 504 of selecting a proposed parcel of land. As will be discussed below, in some instances, this step (as indicated by the parenthetic) can include identifying the parcel based on certain desired attributes, such as proximity to a road. An additional sub-step 506 includes (as explained with regard to FIG. 4) constructing a geographic circle centered on the proposed parcel, the geographic circle having a predetermined radius. A further sub-step 508 includes verifying that at least one tire supplier is present within the geographic circle and is capable of supplying the required quantities of scrap tires per year to the plant, at the above-discussed tipping fee. This verification is referred to in block 508 as making a decision whether criteria are met, for illustrative brevity.

With regard to the parenthetic notation in step 504, desired attributes that might lead to selection of a putative parcel are an area of from about two acres to about six acres; access to a roadway, a waterway, and/or a railway, capable of delivering the tires to the plant; location within a geographical region in which it is permissible for the plant to operate (e.g., based on zoning); access to a sewer system capable of handling waste water from the plant; access to an electric power grid which will pay a suitable predetermined amount, such as at least about fifty 2008 United States dollars (which can be adjusted for inflation as discussed with other parameters herein) per megawatt hour for the electricity (in the case when electricity is to be sold); access to an adequate water supply; and the like. In some cases, if these criteria are not apparent from inspection, they may be made part of a more detailed check, such as block 508.

Step 514 can also include, in some cases, sale of scrap steel from the tires, sale of ash from gasification of the tires, and/or sale of renewable energy certificates generated by virtue of electricity production by the plant.

In another aspect, also depicted in FIG. 5 for brevity, an exemplary method can be carried out for locating a gasification plant employing predominately tire-derived fuel as a feedstock. Such a method could include, for example, the aforementioned identification step (which again could be carried out, for example, by sub-steps 504-508), as well as step 510, advising a party of the parcel, the party being an operator who wishes to operate the plant on the parcel and sell at least one of synthesis gas, electricity, and steam produced by the plant. In some instances, the steps are performed by a service provider (for example, a consulting firm) and the party is a client of the service provider. In other instances, the steps are performed by an entity associated with the party (for example, an in-house planning department of the party).

It should be noted that FIG. 5 is exemplary and non-limiting. For example, in general terms, a major metropolitan area can be identified, and a site can be located that is within a predetermined distance of such area, for example, preferably within about 150 miles and more preferably within about 80 miles. In some instances, an ideal location will be approximately intermediate two or more major population centers. The predetermined distance value can, in general terms, be based upon a determination that for tires located beyond such distance, the cost of freight would significantly reduce the net profit obtained from the tipping fee. Note the rule of thumb that approximately one scrap tire is generated per person per year—this aspect can be used to locate suitable plant sites using population as a proxy for the number of tires likely to be available as scrap; thus, one can seek to locate a parcel within a predetermined radius from a metropolitan area having at least about 3,500,000 people, and preferably at least about 5,000,000 people.

In a more general approach, a method can include determining the approximate number of scrap tires available per year in a certain area, the tipping fee at which they are available, and so on, and checking whether criteria, disclosed herein, for economic location and/or economic operation are met.

One or more aspects of the invention can be implemented with the aid of a computer. For example, the number of tires available in an area may be determined using an Internet search. Such a search may be used, for example, to determine who the tire haulers are in a certain region, and where they are located. Furthermore, local environmental authorities, such as the New Jersey Department of Environmental Protection, and similar authorities in other jurisdictions, may have web sites or other sources listing regional tire haulers and their tipping fees. Furthermore, computer technology can be employed to identify suitable parcels of land by employing computer graphics with maps of a state or other geographic region, having overlays to show locations of, for example, brownfields sites (real property, the expansion, redevelopment, or reuse of which may be complicated by the presence or potential presence of a hazardous substance, pollutant, or contaminant—the skilled artisan will be familiar with the concept of brownfields as known, for example, from the Unites States Environmental Protection Agency (EPA)), urban enterprise zones, and the like. Such graphics and overlays can make use, for example, of the OpenGIS™ Web Map Server Interface Implementation Specification available on the public web site of the Open Geospatial Consortium, Wayland, Massachusetts, USA. Location of sites can also make use of, for example, the types of technologies employed in the well-known Google Earth web site, provided by Google Inc. of Mountain View, California, USA. Note that brownfields may be useful because they tend to be located in industrial-zoned areas, often come with tax breaks and/or credits and other government provided financial benefits, and may be less expensive than alternatives.

Figure 7:
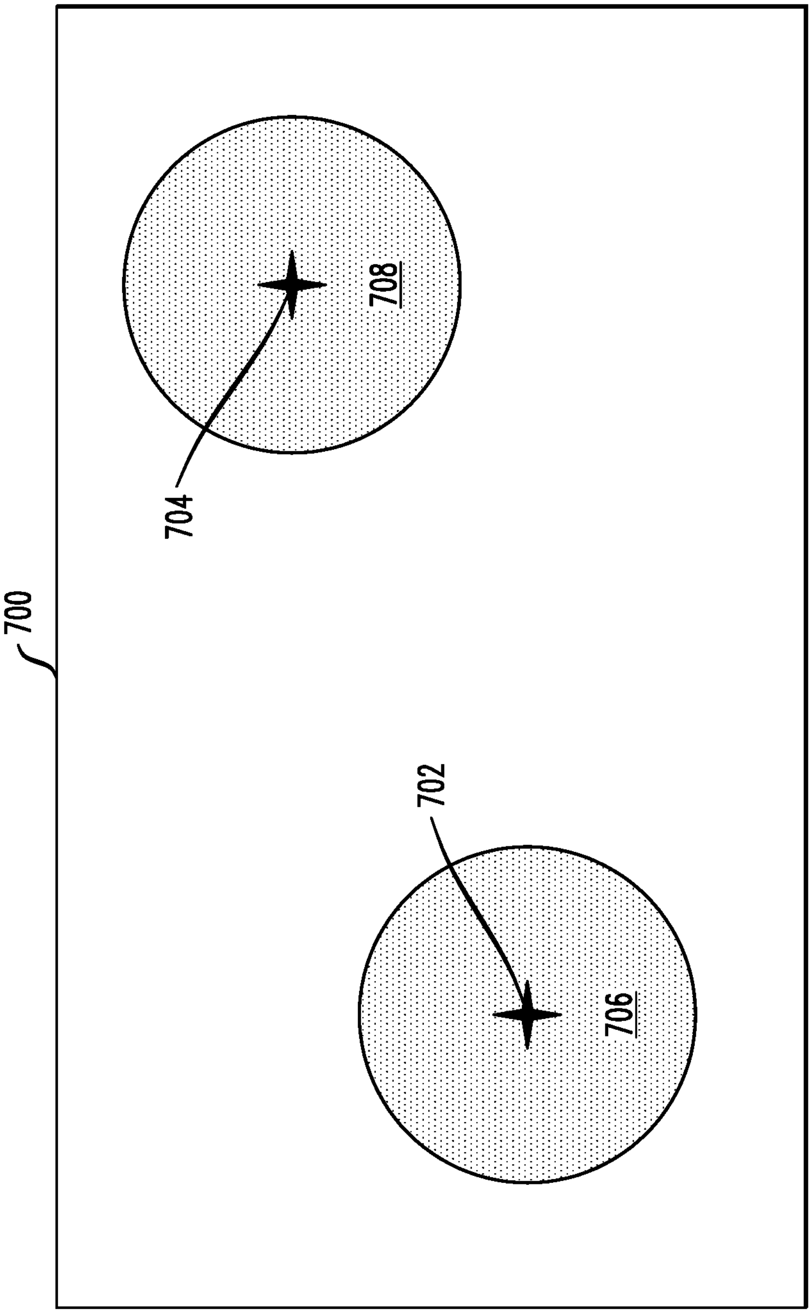
FIGS. 7-9 provide a non-limiting example of an overlay process, according to a still further aspect of the invention.
Figure 8:
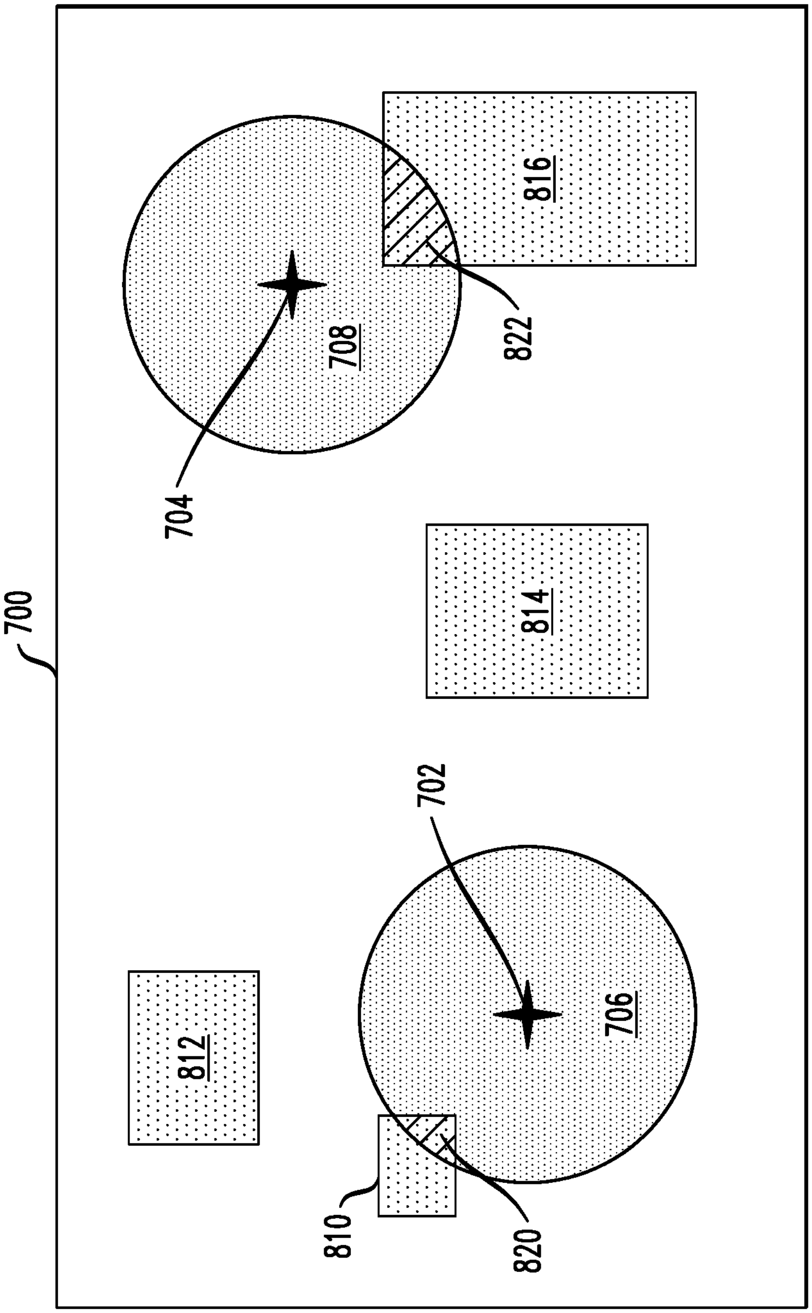
Figure 9:
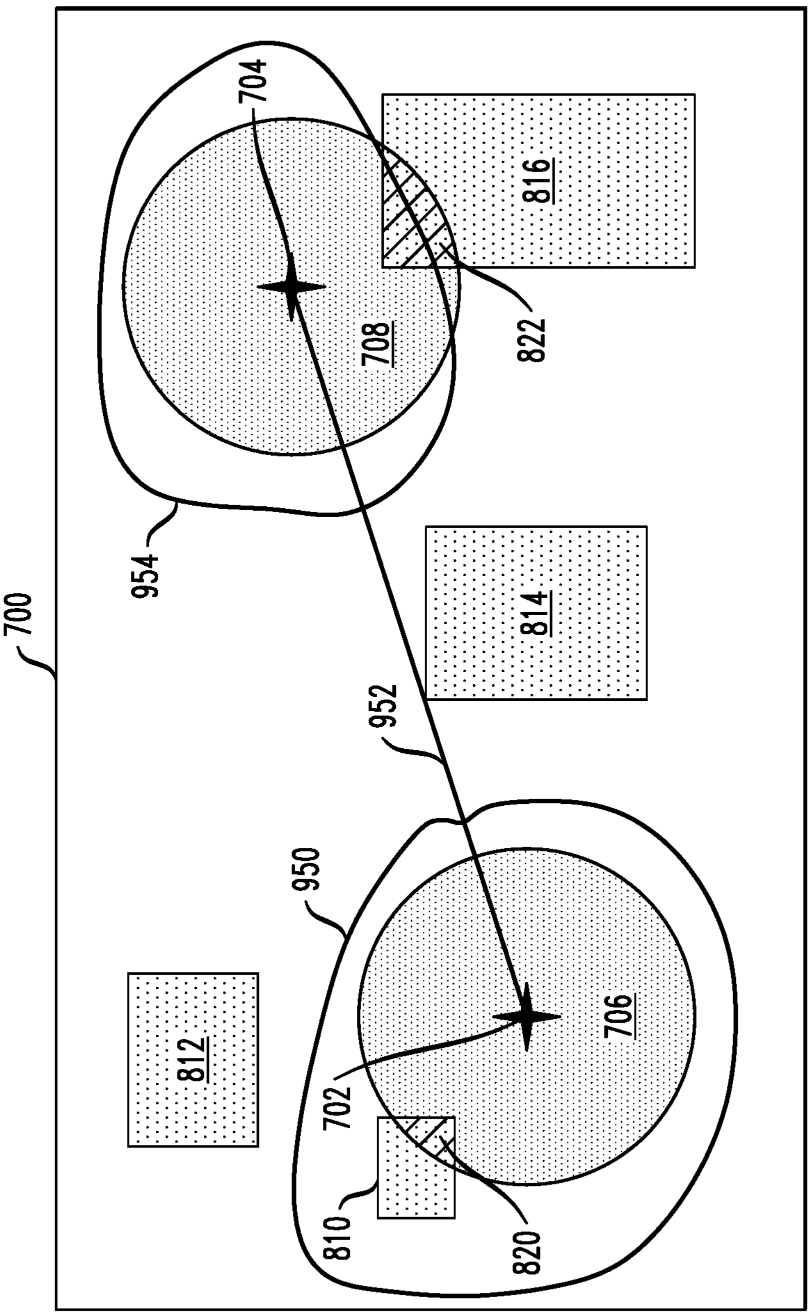

A non-limiting exemplary embodiment of the aforementioned overlay process is depicted in FIGS. 7-9. Element 700 is a geographic region to be analyzed so as to locate one or more suitable parcels of land. Geographic features may be represented, for example, by points, lines, or areas. Region 700 includes two points 702, 704 (represented by "star" shapes) which could be the city centers of two sufficiently large metropolitan regions. Circular areas 706, 708 of appropriate radius are located around each city 702, 704. In FIG. 8, geographical areas of interest 810, 812, 814, and 816 are overlaid upon the map of FIG. 7. In the non-limiting example, these areas may represent areas having suitable industrial zoning. As can be seen, areas 810, 816 overlap with the circular areas 706, 708 at portions 820, 822. Portions 820, 822 are thus initial candidates for locating the plant. This process could be repeated for other area overlays representing, e.g., brownfields, regions with acceptable pollution regulations, and the like. For example, the second overlay might not intersect with portion 820, but might intersect with some part of portion 822, further narrowing the potential plant site.

FIG. 9 shows a still further overlay of interesting features represented by lines. The lines could represent, for example, roads, rail lines, sewer lines, waterways, electric lines, and so on. In this example, they may be considered as an interstate highway 952 connecting the two cities, with two interstate beltways 950, 954. Here, portion 820 is not adjacent one of the roads, but portion 822 is, so portion 822 may be the best site. Again, additional overlays of other features represented by lines could also be provided. For example, an overlay of secondary roads, waterways, and rails lines might show that while portion 820 was not adjacent the interstate or beltway, it was close to a secondary road, waterway, and rail line, and therefore was preferred to portion 822. As noted, similar overlays could be provided for sewer lines, electric lines, and so on. Furthermore, some features might be represented by lines, areas, or points (for example, a river could be a line on a small scale map but an area on a large scale map; a city could be a point on a small scale map but an area on a large scale map).

The overlay process may be carried out using a suitable geographic information system (GIS); for example, a GIS software solution executing on one or more hardware processors. Given the teachings herein, the skilled artisan will be able to adapt available GIS software to implement techniques of one or more embodiments of the invention. Potential suppliers of such GIS software include Bentley Systems, Incorporated of Exton, Pennsylvania, USA; ESRI of Redwoods, California, USA; Intergraph Corporation of Huntsville, Alabama, USA; MANIFOLD software from Manifold Net Ltd., Carson City, Nevada, USA; "Mapinfo" from Pitney Bowes Software of Troy, New York, USA; Smallworld from General Electric of Fairfield, Connecticut, USA; and open source products such as the Geographic Resources Analysis Support System (GRASS) from the Open Source Geospatial Foundation, New castle, Delaware, USA; or uDig, supported by Refractions Research of Victoria, British Columbia, Canada.

For the avoidance of doubt, it should be noted that in some instances, a putative plant site can be identified and then its suitability can be checked, as in FIG. 5; in some instances, the plant site can be located using the overlay process; and in some instances, a "mix and match" approach can be taken wherein the overlay process is used to identify areas to look for putative sites for sale, or the overlay process is used to verify the acceptability of a putative site, and so on.

Thus, in at least some instances, an identifying step includes the sub-step of generating a visual representation of a geographic region of interest 700, wherein the visual representation includes at least one window 706, 708, 810, 812, 814, 816 adjacent the at least one tire supplier (or metropolitan region with likely source of tires) 702, 704. An additional sub-step includes superimposing over the visual representation at least one criteria object 950, 952, 954, comprising at least one of a point, a line, and an area. In other cases, the regions 706, 708 may be considered as the windows and the regions 810, 812, 814, 816 may be considered as the criteria object(s). In some instances, the at least one criteria object may represent one or more of a roadway capable of delivering the tires to the plant; a waterway capable of delivering the tires to the plant; a railway capable of delivering the tires to the plant; a sewer system capable of handling waste water from the plant; and an adequate water supply. A further sub-step may includes identifying the parcel (e.g., in location 822) as lying within the at least one window and proximate the at least one criteria object.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media) and are implemented on one or more hardware processors. Appropriate interconnections via bus, network, and the like can also be included.

Figure 6:
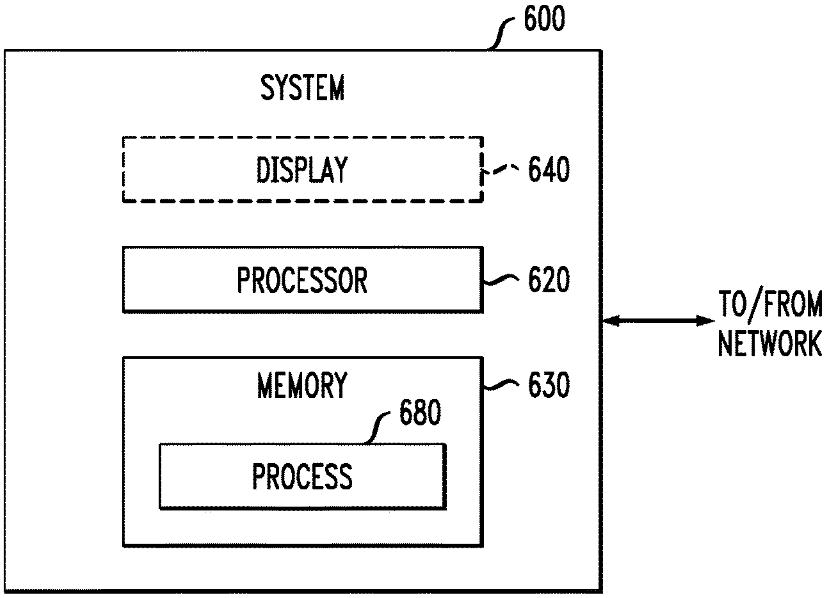
FIG. 6 is a block diagram of a computer system useful in connection with one or more aspects of the invention.

FIG. 6 is a block diagram of a system 600 that can implement part or all of one or more aspects or processes of the present invention. As shown in FIG. 6, memory 630 configures the processor 620 to implement the methods, steps, and functions disclosed herein (collectively, shown as 680 in FIG. 6). The memory 630 could be distributed or local and the processor 620 could be distributed or singular. The memory 630 could be implemented as an electrical, magnetic or optical memory, or any combination of these or other types of storage devices. It should be noted that each distributed processor that makes up processor 620 generally contains its own addressable memory space. It should also be noted that some or all of computer system 600 can be incorporated into an application-specific (ASIC) or general-use integrated circuit. For example, one or more method steps could be implemented in hardware in an ASIC rather than using firmware. Display 640 is representative of a variety of possible input/output devices. An interface to a network can be provided, for example, to connect to the Internet.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network. The computer may use existing software adapted to aid techniques of the invention, or may employ newly-programmed software in any appropriate language such as C++, Visual BASIC, and so on, or may employ combinations of such approaches.

Thus, elements of one or more embodiments of the present invention can make use of computer technology with appropriate instructions to implement method steps described herein.

As used herein, including the claims, a "server" includes a physical data processing system (for example, system 600 as shown in FIG. 6) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include, for example, a data entry module to input data from maps, satellite images, or the like and digitize same (for example, to a vector or raster form); a module for generating the images; and a model for performing the overlays (including, e.g., locating intersecting regions 820, 822). The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. Thus, in some instances, the modules may include an image generation module and an overlay module; the step of generating the visual representation is carried out by the image generation module implemented on at least one hardware processor; and the step of superimposing is carried out by the overlay module implemented on at least one hardware processor.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

It will be appreciated and should be understood that the exemplary embodiments of the invention described above can be implemented in a number of different fashions. Given the teachings of the invention provided herein, one of ordinary skill in the related art will be able to contemplate other implementations of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope of spirit of the invention.

What is claimed is:

1. A method for locating and operating a gasification plant employing predominately tire-derived fuel as a feedstock, said method comprising the steps of:

identifying a parcel of land on which to site said plant, said parcel of land being located such that at least about 3,500,000 scrap tires per year are available for substantially regular and substantially continuous delivery to said plant, at a predetermined adequate tipping fee;

locating said plant on said parcel of land;

operating said plant on said parcel of land by:

shredding at least a portion of said 3,500,000 scrap tires into pellets; and gasifying said pellets to produce synthesis gas;

selling at least one of said synthesis gas, electricity produced by combusting said synthesis gas, and steam produced by combusting said synthesis gas;

wherein said identifying step comprises the sub-steps of:

generating a visual representation of a geographic region of interest, wherein said visual representation includes at least one window adjacent at least one tire supplier location;

superimposing over said visual representation at least one criteria object, comprising at least one of a criteria object point, a criteria object line, and a criteria object area; and identifying said parcel as lying within said at least one window and proximate said at least one criteria object; and wherein locating said plant includes facilitating building said gasification plant on said identified parcel of land.

2. The method of claim 1, wherein, in said generating of said visual representation of said geographic region of interest, said at least one tire supplier location is represented by a tire supplier location point and said at least one window comprises a circle centered on said tire supplier location point.

3. The method of claim 2, wherein said at least one criteria object is said criteria object point.

4. The method of claim 2, wherein said at least one criteria object is said criteria object line.

5. The method of claim 4, further comprising representing at least one of a road, a rail line, a sewer line, a waterway, and an electric line by said at least one criteria object.

6. The method of claim 2, further comprising superimposing at least one area representing favorable zoning over said visual representation including said circle centered on said tire supplier location point to obtain at least one candidate location wherein said at least one area representing said favorable zoning overlaps said circle;

wherein, in said superimposing over said visual representation said at least one criteria object, said at least one criteria object is said line, said line representing at least one of a road, a rail line, a sewer line, a waterway, and an electric line; and wherein said identifying of said parcel as lying within said at least one window and proximate said at least one criteria object comprises identifying said parcel as lying within said at least one candidate location and proximate said at least one criteria object.

* * * * *